April 4, 1961     D. F. KENNEDY     2,978,543
SOUND REPRODUCING APPARATUS

Filed May 23, 1955     13 Sheets-Sheet 1

April 4, 1961  D. F. KENNEDY  2,978,543
SOUND REPRODUCING APPARATUS
Filed May 23, 1955  13 Sheets-Sheet 10

April 4, 1961 D. F. KENNEDY 2,978,543
SOUND REPRODUCING APPARATUS
Filed May 23, 1955 13 Sheets-Sheet 11

Inventor
David F. Kennedy
By Wallace and Cannon
Attorneys

April 4, 1961 D. F. KENNEDY 2,978,543
SOUND REPRODUCING APPARATUS
Filed May 23, 1955 13 Sheets-Sheet 12

Inventor
David F. Kennedy
By Wallace and Cannon
Attorneys

United States Patent Office 2,978,543
Patented Apr. 4, 1961

2,978,543

SOUND REPRODUCING APPARATUS

David F. Kennedy, 2242 S. 15th St., Broadview, Ill.

Filed May 23, 1955, Ser. No. 510,271

3 Claims. (Cl. 179—1)

This invention relates to sound reproduction and to a sound reproducing system adapted in particular to simulate concert hall effects for high fidelity reproduction.

In attempting to simulate realism of the concert hall by imparting the impression of depth to reproduced sound, two principal methods have heretofore been proposed, but these have not come into general use primarily because of the relatively large expense and complicated equipment entailed. By the one method, sound from the original source is reproduced in multiple channels and is recorded as such, which is to say that a binaural effect is sought to be achieved by resorting to closely spaced microphones at the sound source which are then used to record separate channels on a tape or phonograph record. When the tape or record thus produced is utilized to reproduce the sound of the original, this has been done by way of transducers such as ear phones or speakers arranged in a narrow area that are respectively allocated to the aforementioned separate sound channels.

Another system that has been proposed in an attempt to simulate concert hall effects is one wherein three or more microphones are spaced apart in a predetermined relation at the sound source, and these microphones are respectively allocated to different speakers or transducers so that again a multiple channel effect is attained.

As mentioned above, these systems are relatively expensive inasmuch as the arrangements require multiple channel recording at the original source, and one of the primary objects of the present invention is to enable stereophonic reception to be achieved from a monaural production or recording.

A further object of this invention is to obtain what represents the concert hall effect by directly supplying sound emitting means with sound that is to be produced in primary form or time relation, and to supply to the same or another sound emitting means sound of the same source but in delayed time relation with respect to the primary sound; and an object ancillary to this is to achieve sound delay by interposing an air column through which the sound to be delayed is passed. Such delay relation may be attained by multiple air columns of appreciably different length, or by an air column for delayed sound combined with sound of primary time or undelayed form traveling instantly in the usual way between the source and a transducer.

Under the present invention, the concert hall effect is attained in one of its more important forms by feeding a primary or undelayed virtually instantaneous signal from a monaural sound source to a sound reproducing transducer in a sound system, and at the same time feeding a reproducing transducer in the same system with a secondary sound signal obtained from the same source, the second transducer being arranged to feed its sound through a sound delay column so that to the listener the reproduced sound possess depth or presence partaking of stereophonic qualities due to the lag between the primary and the delayed sound, and another object of the present invention is to enable this to be achieved by a relatively simple and inexpensive arrangement that makes possible stereophonic reproduction of sound obtained from any monaural source.

A further object of the present invention is to enable the delayed sound and the primary sound in the system to be balanced so that the primary sound which is first heard by the listener will not tend to objectionably subdue the delayed sound, that is, assuming that the primary and delayed sound waves possess the same amplitude these are to be balanced to the extent that the listener is surrounded by sound as if centered in the very source, rather than hearing the sound primarily from one direction.

Under normal monaural reproduction of sound, there are but two dimensions, namely, frequency range and dynamic range, and another of the objects of the present invention is to enlarge the monaural source by a third dimension, namely reverberation. Moreover, by the present invention, the reverberating effect may be predetermined and selectively attained, and such is particularly advantageous to the arrangement of speakers that will take into account given acoustical characteristics in the room or area used for reception.

A further object of the present invention in this connection is to enhance the separation of the various components of sound that otherwise would not be apparent from monaural production.

Other and further objects of the present invention will be apparent from the following description and claims and are illustrated in the accompanying drawings which, by way of illustration, shows preferred embodiments of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In Figs. 1 to 6 the present invention is illustrated as embodied in a head set and in this connection it may be of significance to point out that head set reception is a preferred form of listening among some advocates of high-fidelity reproduction.

In such embodiment of the invention, sound signals are picked up from a monaural source such as a phonograph, radio or other initial generating source of sound signals and are divided into separate paths. The sound in one path is delayed with respect to sound in the other path, and hence there is primary or undelayed sound in one path and sound in another path delayed with respect thereto. In several instances, the primary and delayed sound are combined at the output, and this same general division and later combining of the primary and delayed sound occurs in the speaker apparatus embodiments to be described hereinafter.

Figure 1:
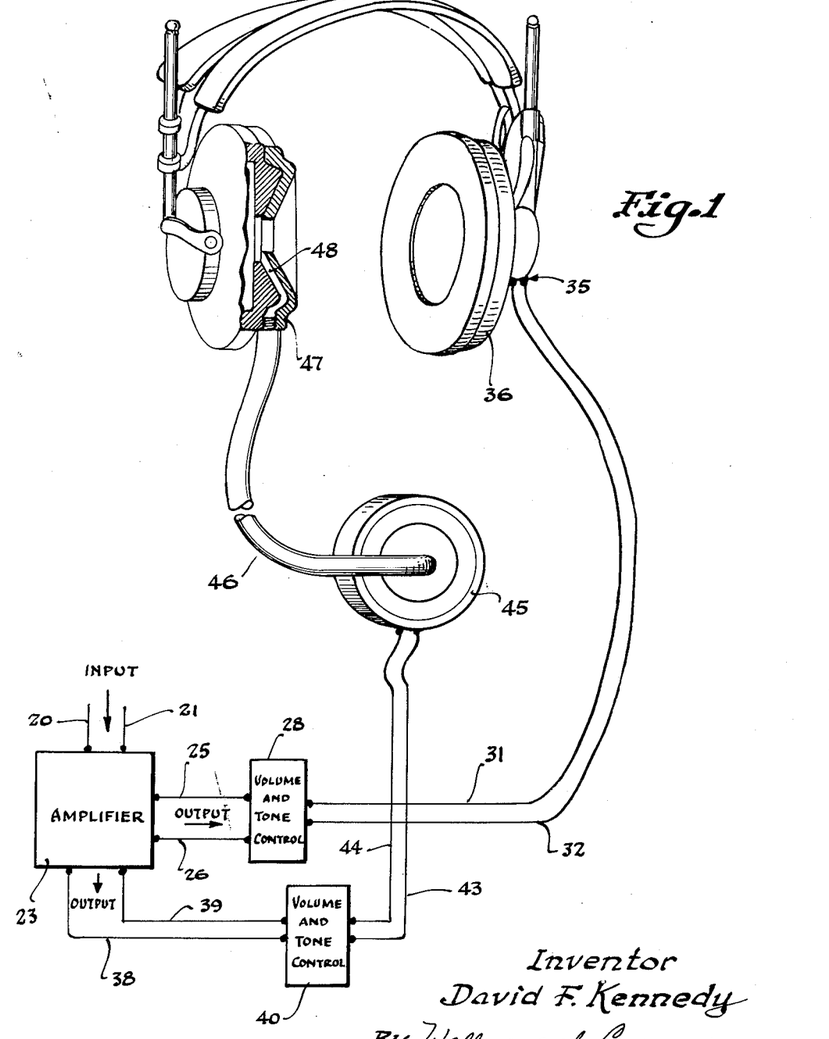
Fig. 1 is a view, partly diagrammatic, of the invention embodied in a head set.

Thus, as shown in Fig. 1, sound signals from a monaural source are fed as an input through wires 20 and 21 to an amplifier 23 of the usual kind. Wires 25 and 26 constituting one output lead from the amplifier 23 to a volume and tone control 28 of the usual kind, and this same output is then fed directly through wires 31 and 32 to a transducer 35 of the usual ear phone type that is associated with the ear piece 36 of the head set.

Another output from the amplifier 23 is fed by wires 38 and 39 to a volume and tone control 40, and this output is then fed from the control 40 through a pair of wires 43 and 44 to a transducer 45 which will transform the signals in the wires 43 and 44 into sound waves in a well known way. To impart delay to the sound emanating from the transducer 45, a delay column in the form of a hollow tube 46 is extended from the transducer 45 to an ear cup 47 associated with the other ear piece of the head set, this ear cup including a sound emitting passage 48 in communication with the delay tube 46.

It will be seen from the foregoing that the listener utilizing the head set will hear in one ear primarily or virtually instantaneous sound emitted from the ear piece 36 and in the other ear will hear delayed sound emitted from ear cup 47, which is merely a suitable means of concentrating the sound from the air column.

The extent to which delayed sound emitted from the air column 46 lags primary sound emitted from the transducer 35 will depend upon the length of the delay column 46. In this connection, it is known of course, that sound in an air column travels approximately one and one tenth feet per millisecond, and I have found that to achieve the best effect a delay of approximately five to twelve milliseconds is satisfactory, seven milliseconds being preferred. In many respects, the amount of delay will depend upon listener preference, but in any event the essential relation is to enable sufficient delay to be achieved that will account for a definite perception of stereophonic depth.

The primary sound emitted from the transducer 35 because of its leading characteristic will normally appear to be the stronger of the two, and it is for this reason that the volume and tone controls 28 and 40 are afforded. In this same connection, it will be recognized that the amplitude of the delay sound will be definitely altered by the air tube 46. Thus, in a restricted air column as 46 there is a tendency for the higher tones on the frequency scale to be attenuated, and consequently the volume and tone controls 28 and 40 will be adjusted to achieve a desired balance as to tone between the primary and delay sounds. In like manner, because the primary signal will be first heard, there is a normal tendency for the listener to perceive the sound as coming from the direction of the transducer 35, and therefore the controls 28 and 40 enable a volume balance to be achieved so that the effect to the listener is that of being entirely surrounded by sound rather than perceiving sound from any particular direction. In other words, the separate volume and tone controls for the two sound channels can be adjusted in accordance with listener preference.

The volume and tone controls thus afforded and to be described hereinafter are not essential to the fundamental effect which is one of stereophonic quality attained by primary sound and delayed sound which synergistically cooperate to produce a definite reverberatory impression that is involved in the depth and presence of concert hall listening.

Figure 2:
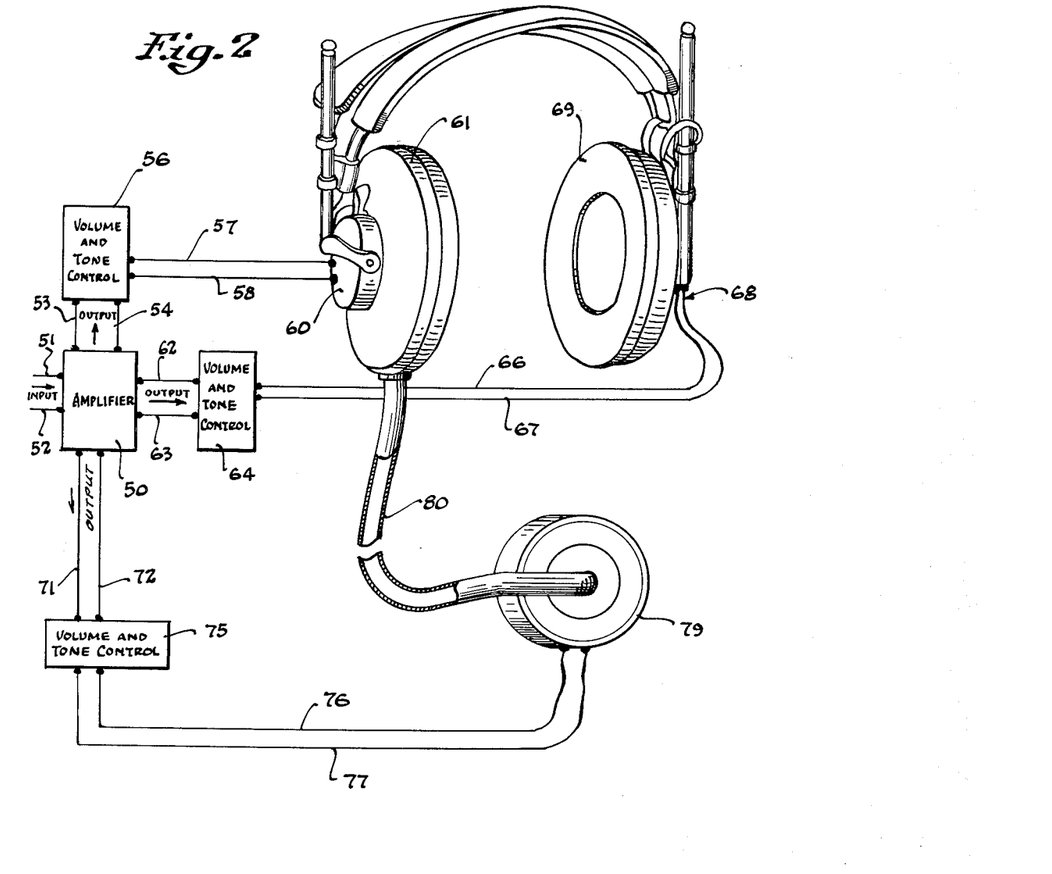
Fig. 2 is a view similar to Fig. 1 wherein both ear pieces are arranged to receive primary sound.

The achievement of the depth or presence effect, while perhaps most impressive in connection with monaural musical recordings, can be attained under the present invention with respect to any kind of monaural source, whether this be merely a recorded conversation, radio broadcast or like monaural source. In Fig. 2 a typical variation is illustrated wherein primary sound is emitted from both ear pieces of the head set while delayed sound is emitted from but one of the ear pieces. This is attained as in the foregoing embodiment by first supplying the amplifier 50 with input from a monaural source through a pair of wires 51 and 52. One output is taken from the amplifier through a pair of wires 53 and 54 leading to a volume and tone control 56, and this output is fed from the control 56 through a pair of wires 57 and 58 to a transducer 60 that is associated with the ear piece 61 so that the ear piece 61 will emit undelayed or primary sound. In a like manner, a second output from the amplifier is afforded by wires 62 and 63 which terminate at a volume and tone control 64, and this second output is fed through a pair of wires 66 and 67 to the transducer 68 of the other ear piece 69. With this arrangement, both ear pieces 61 and 69 will emit primary sound which will be heard simultaneously in both ears of the listener.

Delayed sound is fed to an ear cup included in one of the ear pieces as 61, and this is afforded by a third output through wires 71 and 72 that are extended from the amplifier 50 to a third volume and tone control 75. The third output is then directed by a pair of wires 76 and 77 to a transducer 79 which transforms the electric impulses into sound waves in the usual way, and the reproduction thus obtained is then fed through a fluid delay column in the form of an air tube 80 to the cup of the ear piece 61 which may be like that shown at 47 in Fig. 1.

Figure 3:
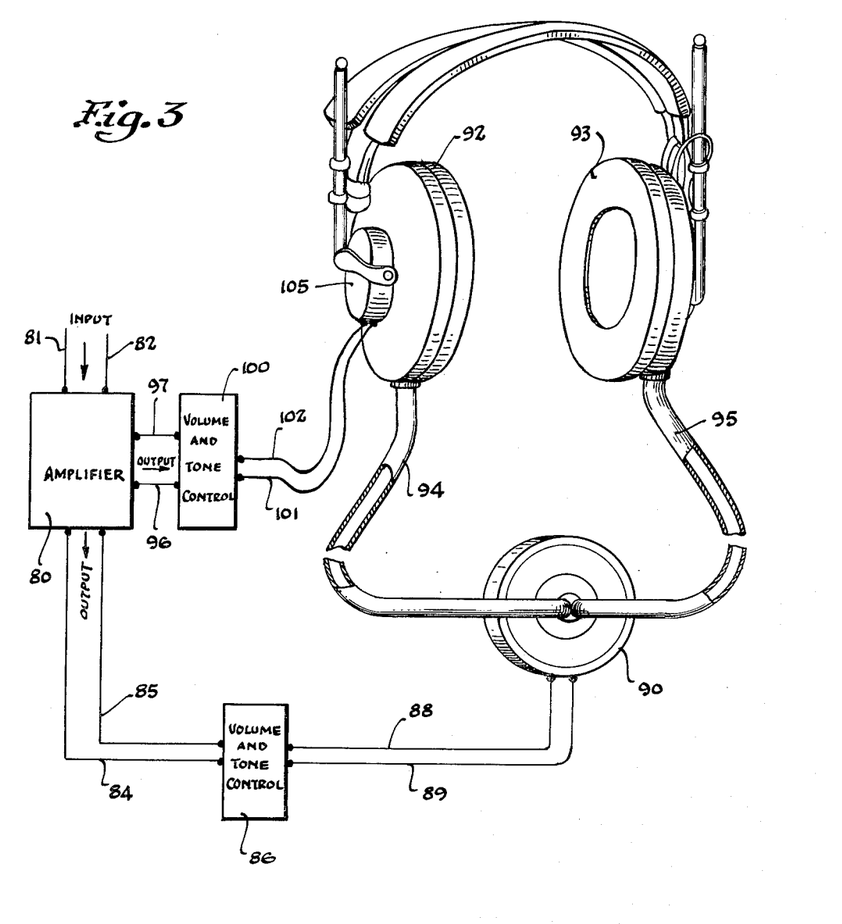
Fig. 3 is a view similar to Fig. 1, wherein both ear pieces receive delayed sound.

The volume and tone controls 56, 64 and 75 are adjusted for listener preference as was described hereinabove. Controls 56 and 64 will be adjusted principally from a volume standpoint, since the ear piece 61 will emit both primary and delay sound, and it is preferred to be able to adjust the volume of the primary sound in the two ear pieces 61 and 69 independently in view of the fact that there is also delayed sound in the ear piece 61 but no delayed sound in the other piece 69. On the other hand, the control 75 will be used principally for tone in accounting for attentuation that occurs in the delay column 80. One advantage of this particular arrangement is that if the listener from a subjective standpoint perceives that there is a tendency for primary sound in Fig. 1 to overbalance the delay sound in spite of volume and tone controls, the arrangement in Fig. 2 may be utilized wherein the inherent strength of the primary sound is imparted to both ear pieces with delay sound present in but one ear piece.

Where it is desired to have primary sound in but one ear and delayed sound in both, the arrangement in Fig. 3 enables this to be accomplished. The input from the monaural source enters the amplifier 80 through wires 81 and 82, and one output from the amplifier is fed through wires 84 and 85 to a volume and tone control 86. This output is then fed from the control 86 through a pair of wires 88 and 89 that terminate at the transducer 90. The sound produced by transducer 90 is then directed to the respective ear pieces 92 and 93 through respective fluid delay means such as air tubes 94 and 95 which communicate with ear cups embodied in the ear pieces 92 and 93. Accordingly, both ear pieces 92 and 93 emit delay or secondary sound, and while the tubes 94 and 95 have been illustrated as separately connected to the transducer 90, it will be appreciated that this may take the form of a Y-tube having the trunk connected to the transducer 90 and the separate branches thereof terminating at the ear cups of the ear pieces 92 and 93.

Primary or instantaneous sound from a time standpoint is directed to the ear piece 92, and this is attained by a second output from the amplifier 80 afforded by wires 96 and 97 which terminate at a volume and tone control 100. The primary sound signal is then directed from the volume and tone control 100 by a pair of wires 101 and 102 which are used to excite a transducer 105 associated with the ear piece 92. It will be recognized that the ear piece 92 will impart to one ear both primary and delayed sound. The desired quality of the stereophonic effect can be subjectively selected through adjustment of the volume and tone controls 86 and 100, and the nature of this will be readily apparent from what has been set forth hereinabove with regard to volume and tone balancing between the primary and delay channels.

Figure 4:
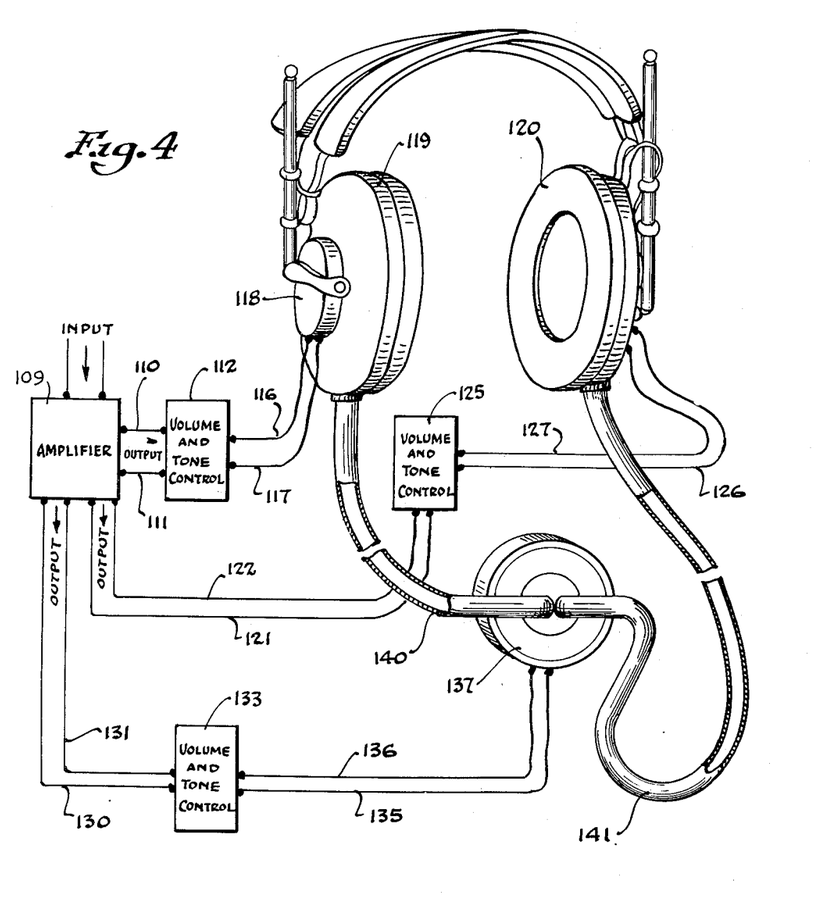
Fig. 4 is a view similar to Fig. 1 wherein both ear pieces receive primary and delayed sound.

As a further modification sound of both primary and delay order may be directed to both ear pieces of the head set and this arrangement is illustrated in Fig. 4 wherein two outputs for primary sound are taken from the amplifier 109 and separately directed to the respective transducers of the head set ear pieces. The first of these primary outputs is taken from the amplifier 109 by wires 110 and 111 and fed to a volumue and tone control 112. This same output is then fed from the volume and tone control through wires 116 and 117 to a transducer 118 associated with one of the ear pieces 119. To enable primary sound to be emitted from the other ear piece 120, a second output is taken from the amplifier by wires 121 and 122 through a volume and tone control 125, and from the volume and tone control 125 through a pair of wires 126 and 127 to the transducer associated with the other ear piece 120. As a consequence, the listener will hear primary or instantaneous sound simultaneously from the ear pieces 119 and 120.

Sound of delay order is also imparted to both ear pieces 119 and 120 in this instance by means of air columns of appreciably different length. These air columns are associated with a third output from the amplifier in the form of wires 130 and 131 which are connected to a volume and tone control 133. Another pair of wires 135 and 136 lead from the control 133 to a sound producing transducer 137. An air column in the form of a tube 140 is extended from the transducer 137 to a cup built into the ear piece 119, and another air column in the form of a tube 141 is extended from the transducer 137 to a cup built into the other ear piece 120. The tube 141 is of appreciably greater length than the tube 140 so that in effect the tubes 140 and 141 will themselves account for primary and delay sound, although both of course are delayed with respect to the fundamental primary sound emitted from the ear pieces 119 and 120. The multiple delays thus achieved can be likened to reverberation from several walls that would be unequally spaced from a concert hall listener, and it can be recognized from this illustration the reality that can be achieved with a monaural source in accordance with the present invention.

Figure 5:
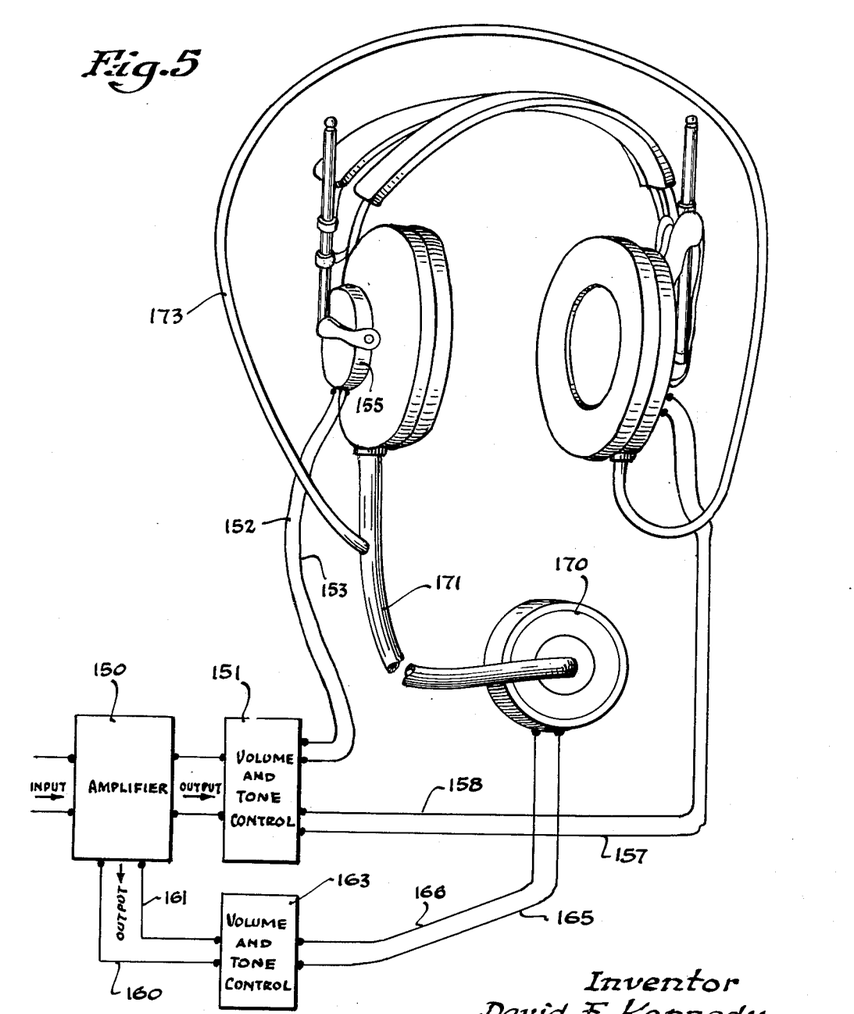
Fig. 5 illustrates a modification of the arrangement in Fig. 4.

The arrangement shown in Fig. 5, and one that is preferred, utilizes primary sound in both ear pieces of the head set, delayed sound in one of the ear pieces of the head set and delayed sound in the other ear piece of the head set under circumstances adapted to reduce the amplitude in comparison to the amplitude in the first named air column or tube. To achieve this, the amplifier 150, Fig. 5, is furnished with an input from the monaural source in the usual way. One output from the amplifier is directed to a volume and tone control 151 as shown in Fig. 5, and this output is then divided so that a pair of wires 152 and 153 will supply the transducer 155 of one of the ear pieces while another pair of wires 157 and 158 supply the transducer associated with the other ear piece. It will be seen that adjustments in the volume and tone control 151 will simultaneously effect primary sound in both ear pieces.

A second output is taken from the amplifier 150 through a pair of wires 160 and 161 which terminate at a volume and tone control 163, and from the volume and tone control 163 a pair of wires 165 and 166 are connected to a transducer 170. An air column in the form of a tube 171 of relatively large diameter is extended from the transducer 170 to an ear cup in the ear piece having the transducer 155, and in this way the ear piece having the transducer 155 receives both primary or instantaneous sound and secondary or delayed sound.

To direct delayed sound to the other ear piece, tube 171 may be advantageously tapped by another air column in the form of a tube 173 of appreciable smaller diameter as compared to the tube 171, and the delay tube 173 terminates at a cup in the ear piece having the transducer supplied with a primary signal from the wires 157 and 158.

Instead of tapping the tube 171 as indicated in Fig. 5, it is advantageous under some circumstances to use a Y-tube having the trunk connected to the transducer 170 and branches as 171 and 173 leading therefrom.

The arrangement in Fig. 5 is adapted in particular to attenuate, that is, reduce the amplitude of the delay sound in the tube 173 as compared to that in the tube 171, which is to say that the two delay sounds will possess different amplitudes. In this connection, it may be pointed out that of the arrangements thus far described that in Fig. 5 most closely approximates the acoustical properties of a concert hall source, and hence is adapted particularly for musical recordings. Thus, inasmuch as the delay sound emitted from the tube 173 will be of relatively weak order in comparison to that emitted from tube 171, this duplicates strong and weak reverberatory results typified by sound waves in a concert hall arriving to the listener from respectively different sound reflecting surfaces. Under this embodiment of the invention it may be advantageous not only to utilize a delay column of less cross sectional area than the other air column, but also one which is of greater length as will be set forth in detail below, and in this manner there will be not only differences in strength but also lag within the delay.

Figure 6:
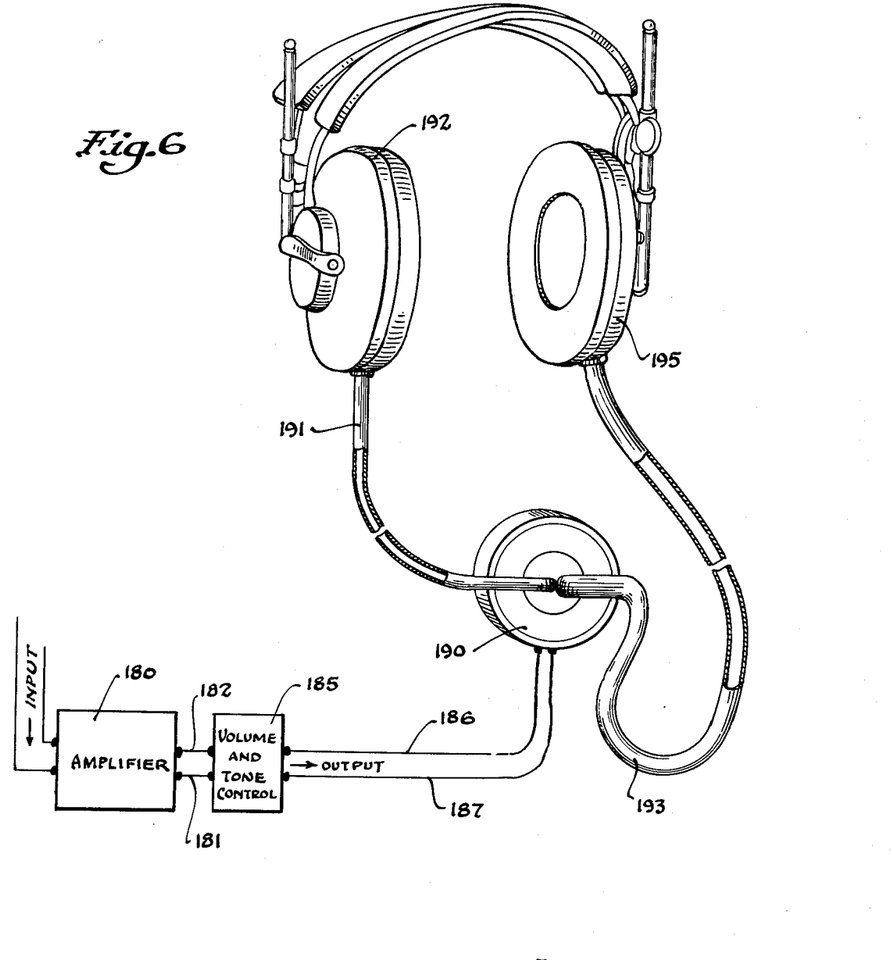
Fig. 6 is a view similar to Fig. 1 wherein the stereophonic effect is achieved solely by air columns of different dimensions.

A more general arrangement involving delay columns of different length and different cross sectional area is illustrated in Fig. 6 which also serves to illustrate that the difference between the primary and the delay sound may be merely an appreciable difference in delay columns. Here, stereophonic production of a definite characteristic is obtained merely by air columns of different length terminating at the respective ear cups of the head set. These air columns are supplied from an amplifier 180 furnished again with input from a monaural source. There is but one output in this instance, and this is afforded by a pair of wires 181 and 182 which lead from the amplifier to a volume and tone control 185. A pair of wires 186 and 187 lead from the control 185 to a transducer 190. The transducer is excited in the usual way. One air tube 191 of relatively short length is extended from the transducer 190 to the cup of an ear piece 192, and it will be appreciated that this ear piece as in the case of all ear pieces receiving sound is of the nature shown at 47 in Fig. 1. A second air column in the form of a relatively long tube 193 also receives sound from the transducer 190, and this tube terminates at a cup in the other ear piece 195. As mentioned, the air columns in this instance are of different length, and the difference will depend upon subjective physiological standards in achieving the impression of depth or presence at the original source. It will be recalled that under the present invention a delay of more than about five milliseconds is involved, this difference representing about the most shallow depth for a noticeable stereophonic effect. Accordingly, the difference in length between the tubes 191 and 193 will be selected with the foregoing low level as a standard. In this instance, the volume and tone control 185 serves merely the primary function of achieving desired volume and tone inasmuch as adjustment of the control 185 will simultaneously effect the quality of the sound in both air columns.

While the arrangements thus far described have involved volume and tone controls that are separate and apart from the amplifier, such may be built in to the amplifier itself where possible, and the arrangement of Fig. 6 is typical in this regard.

As was mentioned, the air columns 191 and 193 are not only of different length but also may be of different cross sectional area as shown in Fig. 6, and under this circumstance the shorter of the fluid delay columns will have the smaller cross sectional area. This is so because the shorter column will impart its sound to the listener in advance of the sound received by the listener from the longer tube, so that by utilizing a shorter tube of smaller diameter the leading effect of the sound in this tube is counteracted due to reduced amplitude.

The embodiment of the invention involved in the head set apparatus is but illustrative of one form of the invention, since the present invention may be advantageously incorporated in transducer apparatus including one or more speakers that impart reverberation to sound signals obtained from a monaural source, or other initial source of sound signals and in Figs. 7 to 12 the invention in this form is illustrated.

As in the foregoing embodiments sound from a monaural source or other source of initial sound signals is divided to produce in separate channels or paths primary and delay sounds emitted from sound emitting means and additionally the primary and delay sounds are balanced through volume and tone controls to achieve the desired quality of reverberation. Delay is preferably accomplished through the medium of an air tube with a signal-to-wave transducer at the admittance end thereof, and wave-to-signal transducer at the emittance end thereof. The primary sound signals are transmitted directly along one path to an output transducer in the form of a speaker or the like, and these same signals are used to excite the transducer at the admittance end of the delay means. The delay sound is then transmitted along its own path to a speaker or like output transducer, and in Figs. 7, 9 and 12 the paths are joined.

Figure 7:
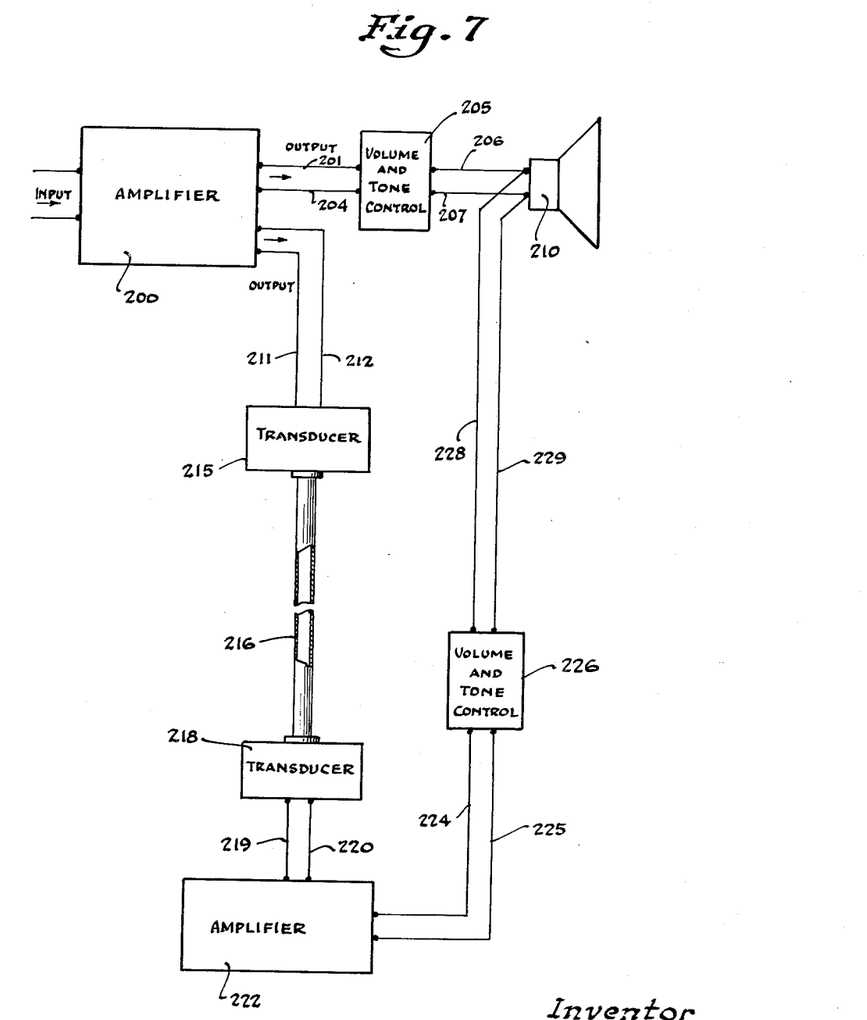
Fig. 7 is a diagrammatic view of the invention embodied in a single transducer in the form of a speaker.

In Fig. 7, sound reproducing apparatus is illustrated wherein a single transducer in the form of a speaker emits both primary and delay sound and this arrangement is analogous to apparatus in the form of a single ear piece adapted to emit both primary and delay sound. In achieving this, an input from a monaural source is supplied to an amplifier 200. A primary output is taken from the amplifier 200 through a pair of wires 201 and 204, and this first output or primary signal as in the foregoing embodiments is directed to a volume and tone control 205 and then by a pair of wires 206 and 207 to a transducer which in this instance is in the form of a speaker 210 having the usual voice coil.

A secondary output or signal that is to undergo sound delay as in the foregoing embodiments is directed by a pair of wires 211 and 212 to a transducer 215, and the sound emitted from the transducer 215 is directed through a volume of fluid in a form of an air column 216 to a transducer 218 which is of the kind which translates sound waves into corresponding electrical impulses. The signals representative of sound thus originating in the transducer 218 are directed by wires 219 and 220 to an amplifier 222 of the usual kind, and the signals from the amplifier 222 are directed by wires 224 and 225 to a volume and tone control 226 allocated to delay sound. The volume and tone control 226 is then connected directly to the transducer 210 by wires 228 and 229.

It will be recognized that since the final production of both primary and delay sound is obtained through the speaker 210, delay sound will be generated by electrical impulses that excite the voice coil of the speaker 210 in comparison to the previous modifications where delay sound is heard directly from the delay air column. Thus, in this instance, delay occurs between the transducer 215 and the transducer 218, and the extent of delay will, of course, be predetermined by the selected length of the air column 216. The purposes served by the volume and the tone controls 205 and 226 will be apparent from what has been described above.

In the arrangement illustrated in Fig. 7, both primary and delay sound are emitted by but a single transducer. Such enables a relatively sharp reverberatory or depth effect to be achieved. As a consequence, the area where the speaker 210 is utilized need not be acoustically oriented to the degree that would be entailed were a speaker as 210 to be excited only by a monaural signal. Thus, the reverbatory effect referred to will be manifest in the inherent echo characteristics that are originally achieved by auditorium or hall acoustics. Again it is to be stressed that the present invention, while perhaps utilized to greatest advantage in musical reproductions obtained from a monaural source, may be used in any instance where it is desired to impart the dimension of depth or reverberation to sound obtained from a monaural source such as radio, phonograph, tape recording or the like.

Figure 8:
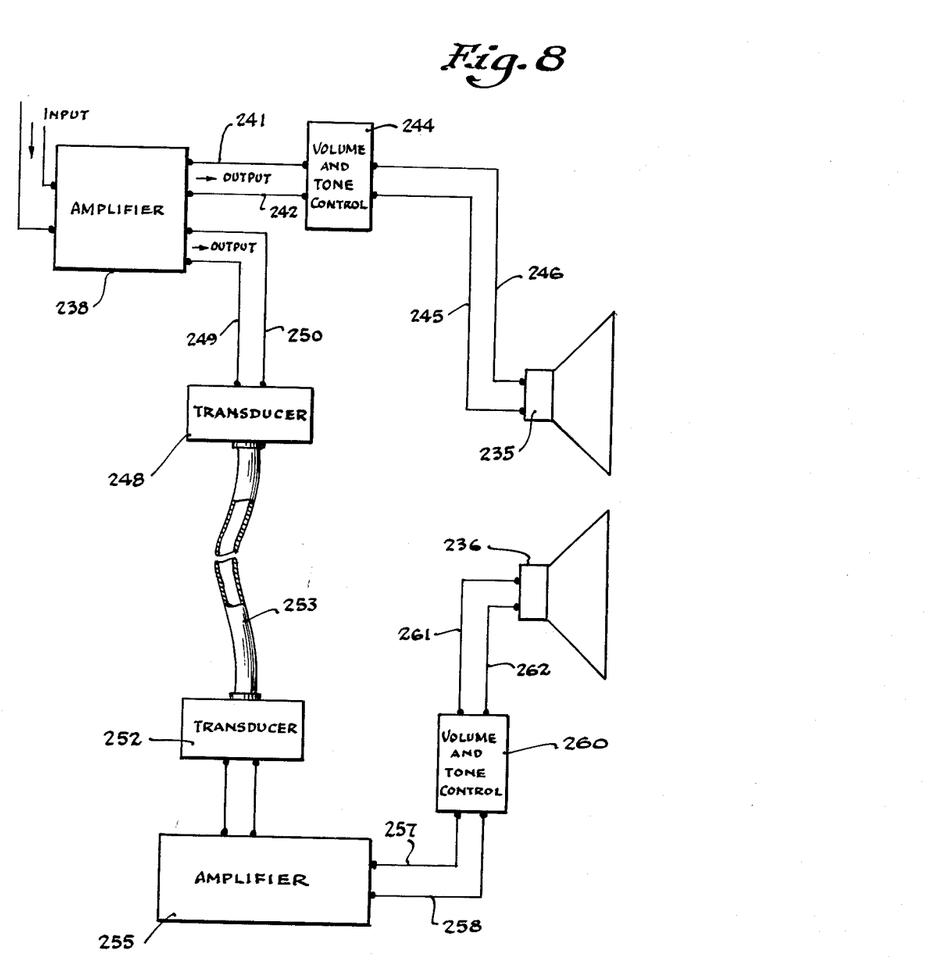
Fig. 8 is a diagrammatic view of the invention embodied in a pair of transducers in the form of speakers, one for delayed sound and one for primary sound.

One method of achieving a true stereophonic effect in speaker apparatus in accordance with the present invention is that illustrated in Fig. 8 wherein two separate transducers 235 and 236 may be arranged in a predetermined spaced relation within an area. A monaural input is furnished to an amplifier 238, and a primary signal is derived from the amplifier 238 by wires 241 and 242 which furnish a primary signal to a volume and tone control 244. From the control 244, wires 245 and 246 lead to and terminate at the transducer 235 which will be effective to produce primary sound of the source.

A secondary output is taken from the amplifier 238 and is furnished to a transducer 248 by means of wires 249 and 250. The transducer 248 is of the kind which translates electrical impulses into sound waves, and these sound waves are transmitted from the transducer 248 to a transducer 252 having the opposite effect, this being accomplished through an air column in the form of a tube 253. The signals set up by the transducer 252 are fed to an amplifier 255 and from the amplifier 255 through wires 257 and 258 to a volume and tone control 260. Wires 261 and 262 then feed signals of delayed order to the transducer 236.

Thus, the speaker 235 produces sound of primary characteristic, and the speaker 236 produces sound of delayed characteristic as compared to that emitted from the transducer 235. Again, the extent of delay will depend upon the length of the delay air column 253, and to achieve relative balance between the primary and delay sound the controls 244 and 260 will be adjusted accordingly. Inasmuch as there are two transducers in this instance, one producing primary sound and the other producing delayed sound, the result to the listener will be a true stereophonic effect, that is, an impression of being surrounded by the original source.

Figure 9:
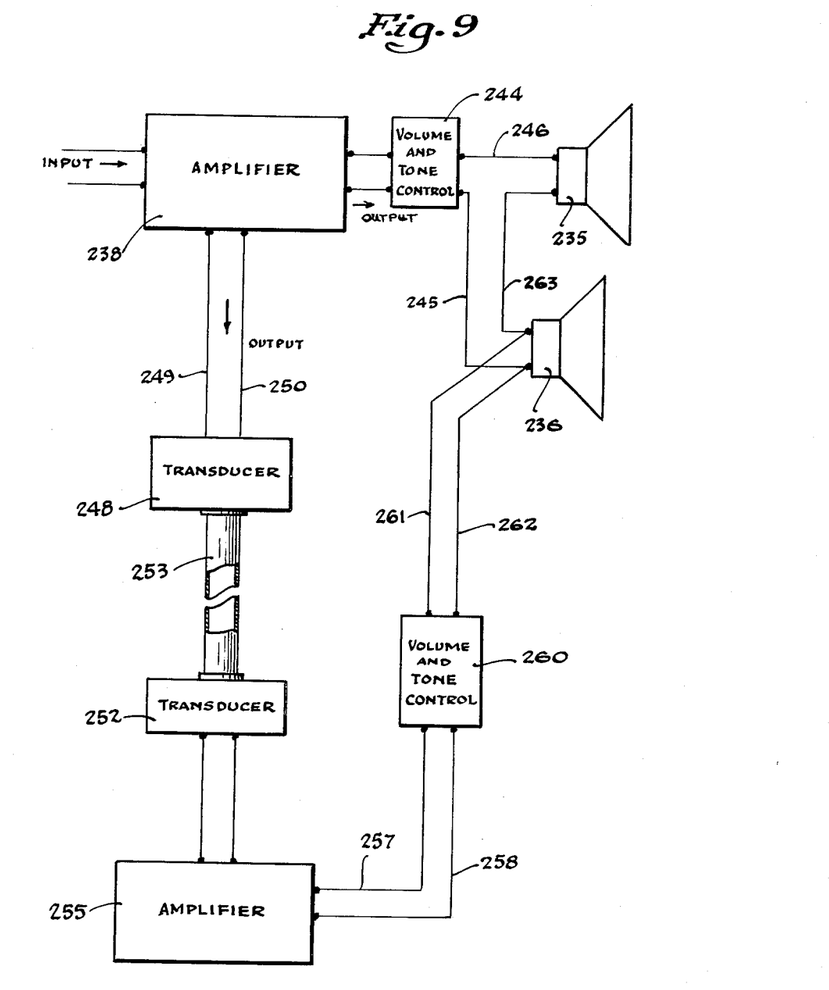
Fig. 9 is a diagrammatic view illustrating the way in which the transducers shown in Fig. 8 may be connected in series for simultaneous reproduction of primary sound.

The arrangement illustrated in Fig. 8 may be modified to advantage by connecting in series the transducers 235 and 236 so that these transducers will produce primary sound simultaneously in each instance. Inasmuch as this arrangement shown in Fig. 9, is otherwise identical to what was described above in connection with Fig. 8, the modifications alone will be described. Thus, wire 246 is connected to the transducer 235, and the wire 245 is connected to the transducer 236. A series connection in the form of a wire 263 is then extended between the respective transducers 235 and 236, and in this way a primary signal will be furnished from the amplifier 238 and the volume and tone control 244 simultaneously to both speakers. As in the embodiment in Fig. 8, speaker 236 receives delayed sound so that the speaker 236 produces both primary and delayed sound. The advantage of this is that the primary signal may be distributed to any selected number of speakers, and some of the speakers producing primary sound will also produce delay sound. In other words, by modifying a transducer in the form of a speaker to produce both primary and delay sound, the acoustical properties or given acoustical situation in the area where stereophonic reproduction is to be obtained may be readily accommodated by so placing the speakers as to blend the production of the different speakers into the acoustical situation presented.

Depending upon the acoustical situation that may be encountered, it may be desirable to produce delay sound from a plurality of transducers, the arrangement being such that separate delay channels of different length are used. Moreover, an additional transducer excited by primary or undelayed sound may be combined therewith, and in Fig. 10 a system of this kind is controlled from an amplifier 270 receiving an input as indicated from a monaural source. One output of the amplifier 270 is directed to a volume and tone control 271, and from the volume and tone control 271 to a transducer 272 for producing primary sound of the source.

Figure 10:
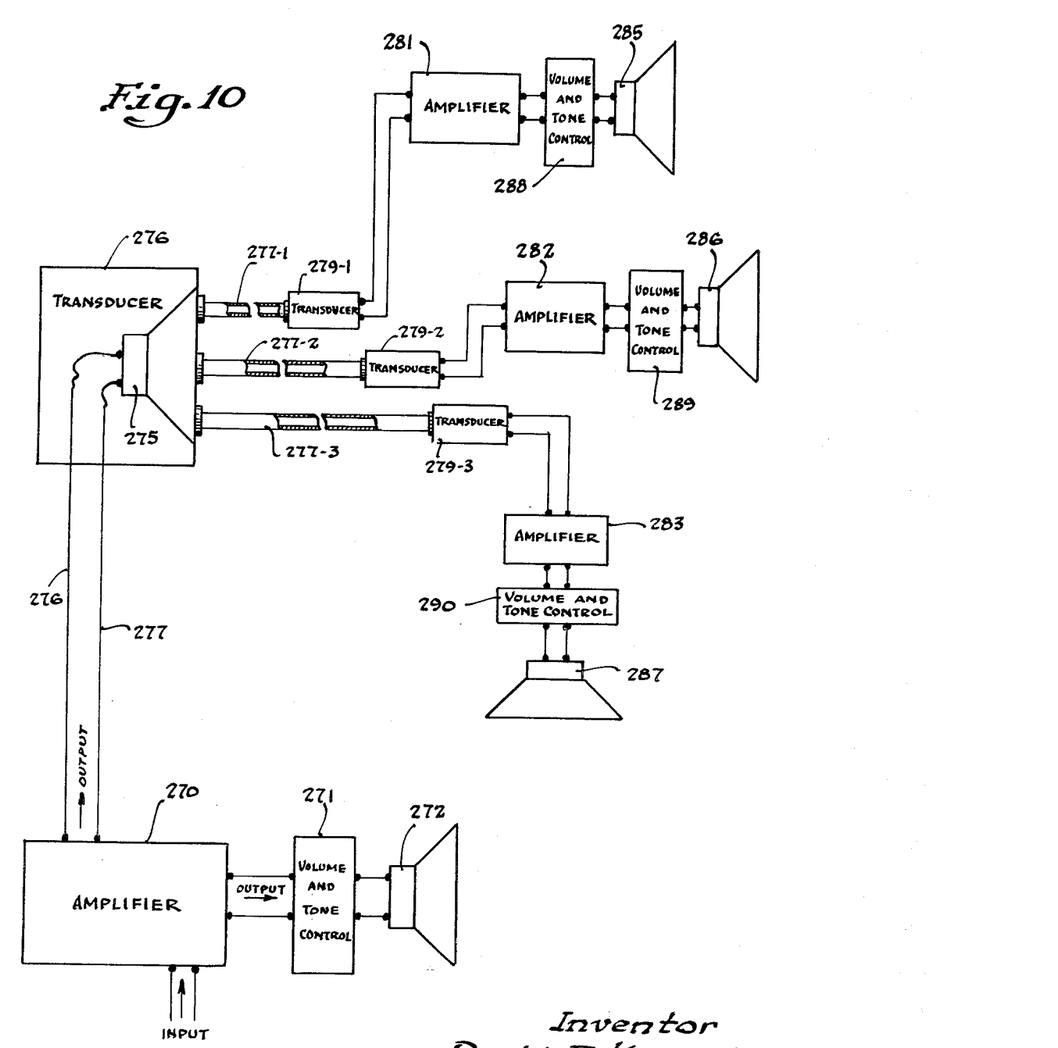
Fig. 10 is a diagrammatic view illustrating the way in which a plurality of transducers in the form of speakers may be selectively arranged in parallel to accommodate a given acoustical situation or preference.

A secondary output is furnished by the amplifier 270 to a transducer 275 which may be in the form of a speaker, wires 276 and 277 being extended from the amplifier 270 to the transducer to transmit secondary signals in the usual way.

The transducer 275 is enclosed in a suitable housing 276, and associated in series with the transducer 275 are a pluarity of delay columns in the form of tubes 277-1, 277-2 and 277-3 and there are of increasing length in the order mentioned as will be apparent from Fig. 10. Thus, the delay columns 277-1, 277-2 and 277-3 will receive simultaneously sound waves from the transducer 275, and these sound waves traveling in the air columns thus afforded are adapted to excite transducers 279-1, 279-2 and 279-3. The impulses set up by the transducers 279-1, 279-2 and 279-3 are directed along corresponding pairs of wires to respective amplifiers 281, 282 and 283 in the usual way, and it will be recognized, of course, that the signals thus received by these three amplifiers will be of delayed phase of the order in which the aforementioned air columns differ in length. The amplifiers 281, 282 and 283 are associated respectively with transducers 285, 286 and 287, and interposed between the amplifier and the transducer in each instance is a volume and tone control 288, 289 and 290. It will be seen from the foregoing that the transducers 285, 286 and 287 will produce sound which is phased in accordance with the lag that occurred in the delay columns 277-1, 277-2 and 277-3, and depending upon subjective standards or the acoustical characteristics of the area where the transducers 285, 286, and 287 are located the volume and tone controls shown in Fig. 10 will be accordingly adjusted to attain the desired balance not only with respect to sound of delay order but also with respect to the transducer 272 which produces sound of primary or undelayed characteristic. It will be recognized that the arrangement in Fig. 10 is a refinement or modification of the arrangement shown in Fig. 8, inasmuch as the arrangement in Fig. 12 can be looked upon as one wherein sound of delay order overbalances the primary sound, whereas the arrangement in Fig. 8 can be looked upon as one wherein the primary and delay sound are more or less in balance so far as the number of transducers allocated thereto may be concerned, thereby serving further to demonstrate flexibility and the extent to which areas of differing acoustical properties may be accommodated.

Figure 11:
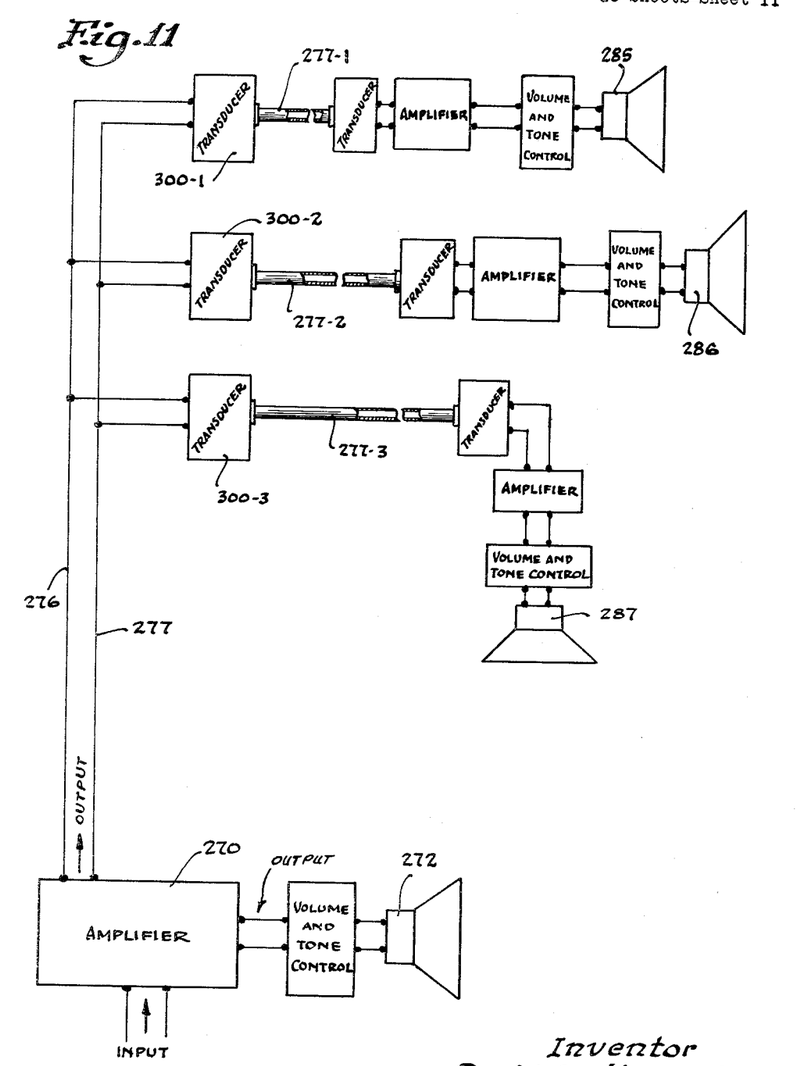
Fig. 11 illustrates a modification of the arrangement in Fig. 10.

Instead of a common transducer as 275 supplying a plurality of delay columns, it may be advantageous to utilize individual transducers for furnishing sound waves to the air columns 277-1, 277-2 and 277-3, and in Fig. 11 this aspect of the invention is illustrated. Inasmuch as the arrangement is otherwise similar to that described above in connection with Fig. 10, only those changes that are characteristic of this modification need be emphasized. Thus, the secondary signal output from the amplifier 270 afforded by the wires 276 and 277 is fed in parallel to three transducers 300-1, 300-2 and 300-3 through respective connections between each transducer and the wires 276 and 277. Sound waves created by transducers 300-1, 300-2 and 300-3 will of course be duplicates of the source and are fed into the delay tubes 277-1, 277-2 and 277-3 that were described above, and otherwise the arrangement of Fig. 10 is duplicated.

Figure 11A:
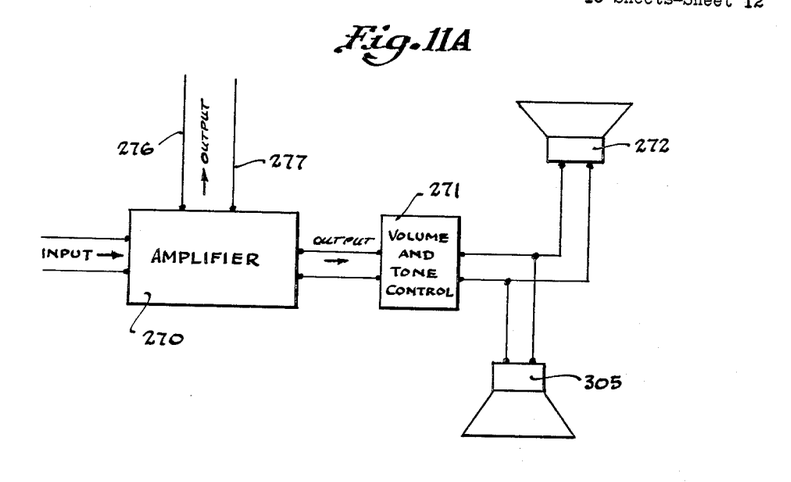
Figs. 11A and 11B illustrate the way in which primary sound may be supplemented for a different acoustical situaiton or preference.
Figure 11B:
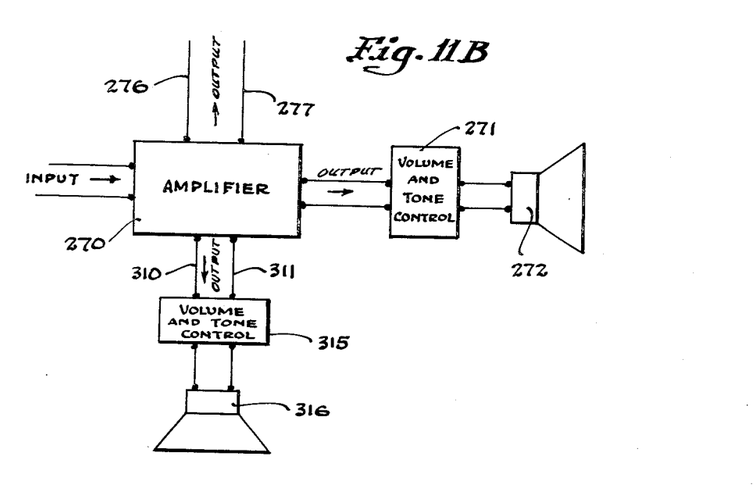

In order to tend to bring the primary sound back into balance with the secondary or delayed sound where an overbalance is not required or desired, while otherwise utilizing secondary sound of the order indicated in Figs. 10 and 11, a plurality of speakers for producing primary sound may be resorted to, and this is illustrated in Figs. 11A and 11B which apply to either Fig. 10 or Fig. 11 as will be observed from the relative position of the amplifier 270 and the output wires 276 and 277. Thus, to emphasize primary sound in the speaker system of Figs. 10 and 11, an additional transducer 305 for primary sound may be arranged in parallel or series with the primary transducer 272. In Fig. 11A, a parallel connection is illustrated, and it will be further observed that the volume and tone control 271 will simultaneously control both transducers 272 and 305.

To achieve at the same time separate control over a plurality of transducers used for creating primary sound, separate outputs may be taken from the amplifier 270 as shown in Fig. 11B. Thus, the transducer 272 will be supplied by an output from the amplifier 270 as described above so that this transducer may be separately adjusted by its control 271. An auxiliary output in the form of a pair of wires 310 and 311 is extended from the amplifier 270 to a volume and tone control 315 that is associated with a primary transducer 316, so that control over the transducer 316 though the control 315 may be selectively and individually achieved instead of the arrangement shown in Fig. 11A.

Figure 12:
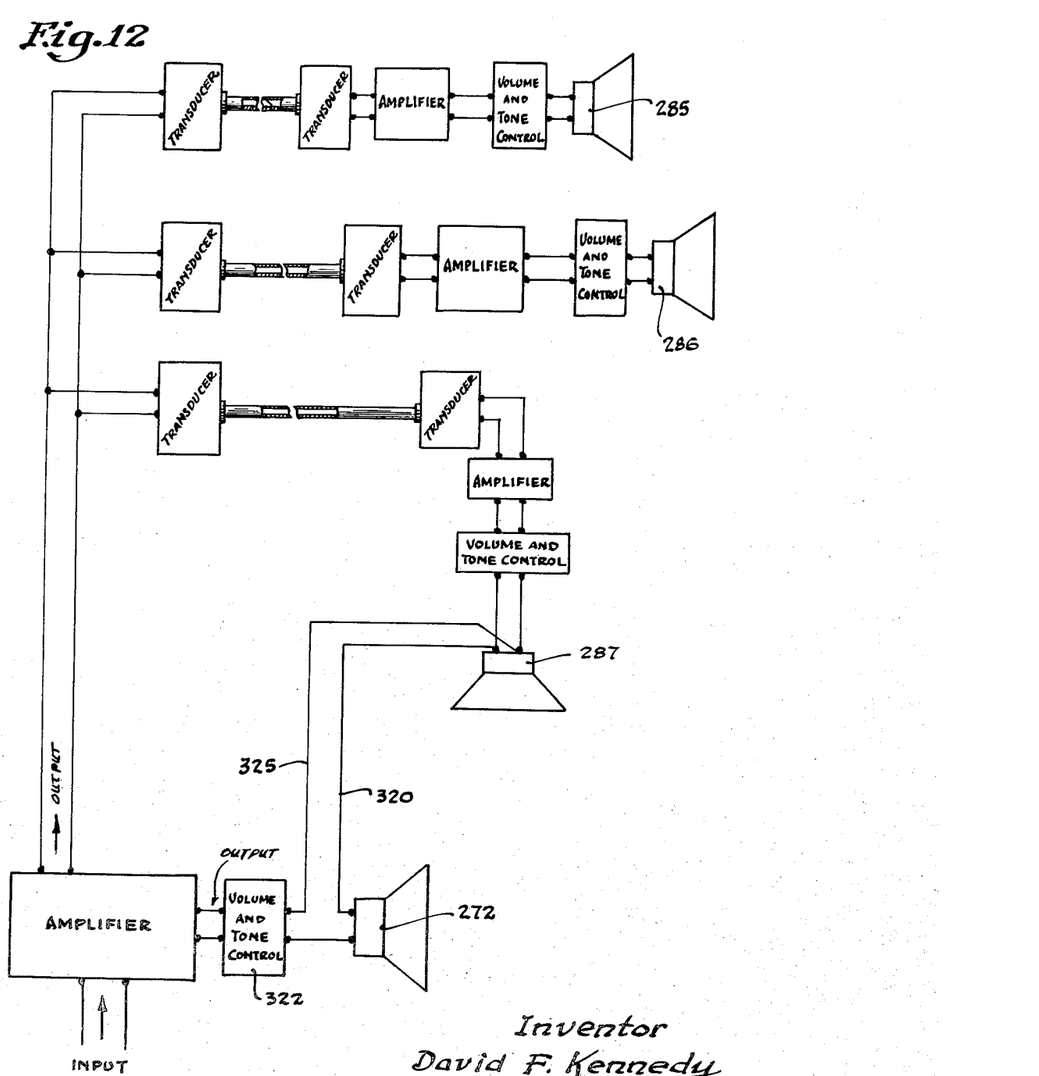
Fig. 12 illustrates the way in which primary and delayed sound may be mingled in selected of a group of transducers in the form of speakers.

As was described in connection with Figs. 7 and 9, mixing of sound in delayed and primary channel may be accomplished through a common transducer, and the way in which this may be accomplished in the arrangements of Figs. 10 and 11 is illustrated in Fig. 12 which, it will be observed, with the exception of certain changes to be described hereinbelow, is otherwise identical to Fig. 11. Thus, primary and delay sound may be mixed or mingled for emission from any number of the transducers in a speaker apparatus, depending upon the effect desired or the acoustical characteristics of the area entailed, and in Fig. 12 but one of the transducers is thus subjected to a mingling of the sound of the respective orders. Thus, it will be observed that tranducers 272 and 287 are connected in series by wires 320 and 325 connected to a volume and tone control 322. In this way, two transducers are subjected to pirmary sound, one of the transducers being also effective to reproduce delay sound.

Further variations of the kind illustrated in Fig. 12 will be apparent, using both series and series-parallel connections between the various speakers.

From the foregoing it will be seen that in accordance with the present invention, sound from a monaural source may be modified so that this sound will have imparted thereto a third dimension, and this has been achieved in a relatively uncomplicated fashion which takes advantage of the delay of sound in a suitable column which in the present instance preferably takes the form of a column of air. While delay columns in the form of tubes have been utilized, it will be appreciated that like effects can be attained by columns of other form, the essential factor being that a sound emitting means be afforded for producing from a monaural source primary and delay sound that cooperate to achieve a reverberatory dimension.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In apparatus of the kind described which is to reproduce sound from a source of sound signals, a plurality of sound emitting means for listener reception and each including a transducer, means by which the transducers produce simultaneously audible sound of undelayed primary form derived from the source of sound, another transducer for emitting audible sound derived from the same source, means which delay the sound emitted by the other transducer and which conduct reproductions thereof to selected of said sound emitting means which emit undelayed sound whereby delayed sound is mixed with undelayed sound in at least one of said sound emitting means, said delay means including a sound wave relay column interposed between the other transducer and said selected of said emitting means and confining a column of sound wave conducting fluid which delays for at least several milliseconds transmission of the delay sound reproductions from said other transducer to said selected of the sound emitting means.

2. Sound reproducing apparatus of the kind herein described for producing audible sound having perceptible depth in listener reception simulating an original live audible performance such as an orchestra in an auditorium or the like and comprising at least a pair of output sound emitting means for listener reception and each having a transducer for translating sound signals into sound waves emitted by the sound emitting means and to be heard by the listener, an initial source of sound signals representing the live performance, means for transmitting said signals in immediate undelayed form simultaneously to said transducers whereby primary sound representations of said source substantially in simultaneous sound phase are emitted simultaneously by said output emitting means, and sound delay means connected between the source and a selected one of said sound emitting means to delay such signals for at least several milliseconds so that delayed representations of the same source are mixed in appreciable out-of-time phase with primary representations of the same source at said one sound emitting means, said sound delay means being inclusive of at least two essential elements including another transducer connected to the source to receive signals therefrom and to translate these into sound wave representations thereof, and including a sound wave delay column interposed between said other transducer and said one sound emitting means and confining a column of sound wave conducting fluid of a length which will delay for at least several milliseconds the representations emitted by said other transducer and which are the delay representations mixed as aforesaid.

3. In apparatus of the kind described wherein sound is to be reproduced from a source of sound signals, a plurality of sound emitting means each including a transducer, means to enable the transducers to produce simultaneously sound of undelayed primary form derived from the source of sound signals, another transducer, means to enable the other transducer to produce sound derived from the same source of sound signals, and sound delay means connected between one of said sound emitting means and the output of the other transducer and being effective to delay for at least several milliseconds arrival at said one sound emitting means of the sound emitted by said other transducer, whereby said one sound emitting means mixes in its output both delayed and undelayed sound representations of the source.

References Cited in the file of this patent

UNITED STATES PATENTS

| | | |
|---|---|---|
| 2,107,804 | Roux et al. | Feb. 8, 1938 |
| 2,230,836 | Hammond | Feb. 4, 1941 |
| 2,327,956 | Begun | Aug. 24, 1943 |
| 2,403,232 | Parisier | July 2, 1946 |
| 2,419,894 | Hayes | Apr. 29, 1947 |
| 2,517,819 | Young | Aug. 8, 1950 |
| 2,714,633 | Fine | Aug. 2, 1955 |
| 2,852,604 | MacCutcheon | Sept. 16, 1958 |